(12) United States Patent
Kerner

(10) Patent No.: US 6,236,182 B1
(45) Date of Patent: *May 22, 2001

(54) METHOD AND CIRCUIT ARRANGEMENT FOR DETERMINING AN OPTIMUM GAIN FOR THE INTEGRATOR OF A SPEED CONTROLLER

(75) Inventor: Norbert Kerner, Traunwalchen (DE)

(73) Assignee: Dr. Johannes Heidenhain GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/451,203

(22) Filed: Nov. 29, 1999

(30) Foreign Application Priority Data

Nov. 27, 1998 (DE) .............................. 198 54 750

(51) Int. Cl.$^7$ .................................................. G05B 11/36
(52) U.S. Cl. ............................................. 318/609; 700/37
(58) Field of Search .................................. 318/609, 610, 318/568.18; 700/37

(56) References Cited

U.S. PATENT DOCUMENTS

| | | | |
|---|---|---|---|
| 4,109,190 | 8/1978 | McNaughton | 318/609 |
| 4,549,123 * | 10/1985 | Hagglund et al. | 318/610 |
| 4,754,391 * | 6/1988 | Suzuki | 364/157 |
| 5,063,335 * | 11/1991 | Baechtel et al. | 318/609 |
| 5,157,597 * | 10/1992 | Iwashita | 364/157 |
| 5,223,778 * | 6/1993 | Svarovsky et al. | 318/610 |
| 5,263,113 * | 11/1993 | Naitoh et al. | 388/815 |
| 5,475,291 | 12/1995 | Yoshida et al. | 318/568.22 |
| 5,587,896 * | 12/1996 | Hansen et al. | 364/148 |
| 5,684,375 * | 11/1997 | Chaffee et al. | 318/638 |
| 5,736,824 | 4/1998 | Sato et al. | 318/561 |
| 5,973,467 * | 10/1999 | Eguchi | 318/609 |
| 6,127,793 * | 10/2000 | Kerner | 318/561 |

FOREIGN PATENT DOCUMENTS

| | | |
|---|---|---|
| 36 18 337 | 6/1990 | (DE) . |
| 43 33 146 | 3/1994 | (DE) . |
| 44 42 834 | 6/1995 | (DE) . |
| 196 17 867 | 11/1997 | (DE) . |
| 197 34 208 | 2/1999 | (DE) . |
| 197 48 993 | 5/1999 | (DE) . |
| 0 347 465 | 12/1989 | (EP) . |

* cited by examiner

Primary Examiner—Robert E. Nappi
Assistant Examiner—Rina I. Duda
(74) Attorney, Agent, or Firm—Kenyon & Kenyon

(57) ABSTRACT

A method for determining optimum controller parameters for a digital rotational speed control is described, in which various test signals are applied to a speed control loop and the resulting speed characteristic is determined. The speed characteristic is subsequently weighted with respect to rise time and transient response for various controller parameters, and the most favorable controller parameters are subsequently set in the controller of the control loop. The integral-action time of the control loop is used as a criterion in performing the weighting operation.

18 Claims, 3 Drawing Sheets

METHOD AND CIRCUIT ARRANGEMENT FOR DETERMINING AN OPTIMUM GAIN FOR THE INTEGRATOR OF A SPEED CONTROLLER

The present invention relates to a method for determining the optimum gain for the integral-action component of a closed-loop or automatic speed control.

DESCRIPTION OF RELATED ART

U.S. Pat. No. 5,157,597, describes a method to detect oscillations in servo system operation and to modify the loop gain of closed loops. In the process, a characteristic ratio is fixed between the position-control-loop gain and the position deviation in such a way that the loop gain assumes a large value for certain position deviation values. The position deviation is periodically determined during operation, and the main oscillation component of the position deviation is determined. The loop gain of the servo system is adjusted in such a way that the main oscillation component falls within a specified frequency range.

In this scheme, however, although the frequency range in which the servo system begins to oscillate is adjusted, the tendency to oscillate is not diminished. Thus, controller parameters are not optimized, and the adjusted frequency range can shift under different load conditions, which can lead to damaging oscillation in the controlled subassemblies.

U.S. Pat. No. 4,549,123 describes a method for tuning a controller. A nonlinear subassembly, whose output signal has either a constant negative or positive amplitude, is introduced in series to and before the PID controller. The controller parameters are subsequently modified in such a way that the transfer function of the nonlinear subassembly is multiplied by the common transfer function of the controller and the controlled system, to yield the value −1 for a specific amplitude and a specific frequency. The modified control loop can then be brought into self oscillation. Various parameters are then calculated using the Ziegter and Nichols formulas, and the controller is tuned as a function of the calculated parameters.

A drawback of this system is that it requires that the entire controller structure be altered. No provision is made for simply modifying the controller parameters.

EP Patent 347 465 B1 describes a servo motor that is more likely to oscillate at low rotational speeds than at high rotational speeds. The servo motor is provided with a control loop, whose gain in the P-and I-branch of the controller is adjusted as a function of the speed. As a result, at low rotational speeds, the servo motor does not begin to oscillate and, at high rotational speeds, the torque is not unnecessarily limited.

This design has the disadvantage that optimal starting values must already be present in order to have a stable operation. These starting values are then merely adapted to a modified electro-motor speed. The reference does not explain how the starting values are determined.

Optimal controller parameters of a PI-controller in a speed control loop can be automatically determined according to non-prepublished Patent Application DE 197 34 208.6 of the applicant. To adjust a gain in the proportional branch of the controller, a first test signal is fed to the automatically controlled electro-motor, and the resultant speed characteristic is determined as a function of time in a first measuring interval. This speed characteristic is analyzed using a specific weighting function. Using a small gain in the proportional and integral branch of the controller as a baseline, the gain in the proportional branch is continually increased, until a beginning oscillation of the control loop is detected using the weighting function.

The adjusted gain in the proportional branch is then multiplied by a factor of less than one, more particularly of about 0.45, and is adjusted. A second test signal is then fed as a reference input variable to the control loop, to adjust the gain in the integral branch of the controller. The time characteristic of the electro-motor's rotational speed is determined once more in a measuring interval and weighted using a second weighting function. A deviation from the set-point rotational speed is then determined in the measuring interval using an error function. Using as a baseline a gain in the integral branch at which oscillations are present, the gain is progressively reduced until a minimum of the error function is reached. The gain, determined in this manner, is then adjusted in the integral branch.

The disadvantage of this scheme is that when the gain in the integral branch is adjusted, oscillations experienced by the mechanical components coupled to the electro-motor do not decay quickly in the measuring interval. As a result, an excessively low gain exists on a regular basis in the integral branch. This unnecessarily degrades the dynamic response of the entire system that includes the control loop and the machine components.

SUMMARY OF THE INVENTION

The present invention in one aspect is a method for automatically determining the gain in the integral branch of the controller of a speed control loop. The computed gain reliably prevents the entire driving assembly from oscillating and, at the same time, precisely controls the required electro-motor torque being made available, so that the set-point rotational speed is reached quickly. The gain is determined in a way that allows for influences caused both by the electro-motor, as well as by other subassemblies of the driving assembly. Moreover, the method can be implemented simply and cost-effectively.

The method of the present invention allows additional integral-action time of the controller when determining the gain in the integral branch of the controller. The gain in the integral branch of the controller is initially determined in accordance with the method according to applicant's DE 197 34 208.6, incorporated herein by reference in its entirety, and subsequently is selected in proportion to the integral-action time of the controller. This is achieved by multiplying the gain for the integral branch, determined as explained in DE 197 34 208.6, by the integral-action time.

BRIEF DESCRIPTION OF THE DRAWINGS

The present invention is described in the following text on the basis of the specific embodiments depicted in the following drawings. In the drawings.

DETAILED DESCRIPTION OF PREFERRED EMBODIMENTS OF THE INVENTION

In the following description, it is assumed that the method according to the present invention for determining optimum controller parameters is applied to an automatic speed control for a servo motor of a machine-tool. However, it would be evident to one skilled in the art that the method according to the present invention can also be used for any other electro-motor, such as a spindle-drive motor, which is integrated in a mechanical arrangement and whose rotational speed needs to be controlled quickly to reach a set rotational speed.

The method for determining controller parameters described in German Patent DE 197 34 208 of the applicant is included in the method of the present invention, and is described again in detail.

Figure 1:
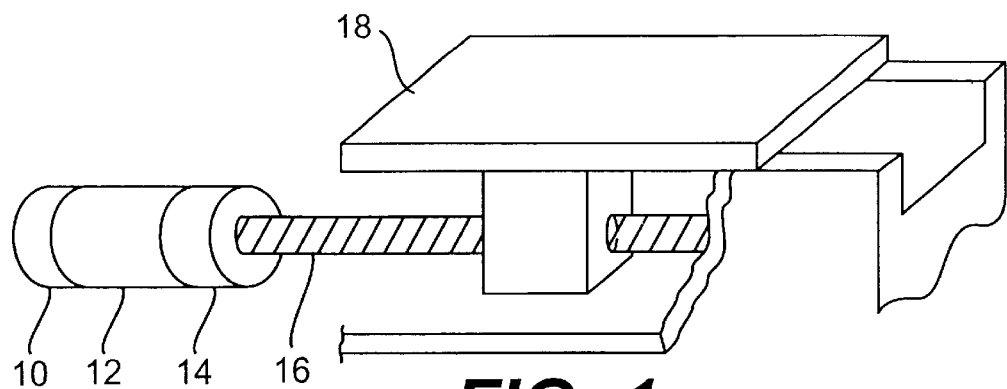
FIG. 1 is a diagram showing an electromechanical driving assembly.

FIG. 1 depicts an example of a driving assembly, in which an electro-motor 12 is coupled to a rotary position transducer 10 and to other mechanical subassemblies, such as to a subassembly 14, which can contain a brake, a coupling, and a gear unit for electro-motor 12. It is not absolutely necessary that all three of the named functions be implemented by subassembly 14. The rotary motion produced by electro-motor 12 is transmitted via a recirculating ball screw 16 to a sliding carriage 18, upon which a workpiece can be clamped, so that these two subassemblies are also part of the driving assembly.

Many machining steps performed on workpieces clamped to the sliding carriage require that sliding carriage 18 be driven with a constant speed. To ensure this, the rotational speed of electro-motor 12 is controlled in a closed loop.

Figure 2:
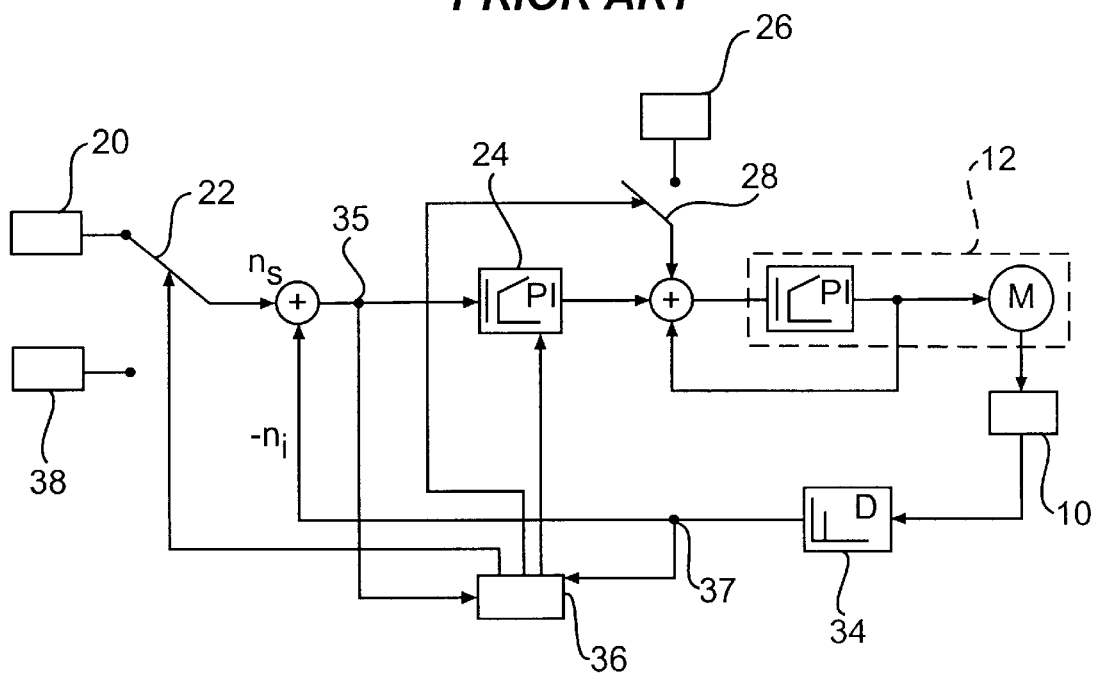
FIG. 2 is a schematic showing a block diagram of an automatic speed control system for an electro-motor according to the present invention.

FIG. 2 illustrates one embodiment of a control loop for automatically controlling the speed of electro-motor 12. Electro-motor 12 has a current controller connected in series, which is not part of the present invention. Actual speed ni of electro-motor 12 is determined by differentiating the positional values of a rotary position transducer 10 as a function of time in a differentiator 34. The speed is added with a negative operational sign in an adder to predefined set-point speed ns, representing the reference input variable.

System deviation ns-ni is fed to electro-motor 12 by a controller 24, which includes a proportional and an integral branch (P- and I-branch) having the corresponding P- and I-control characteristic, and whose gains are separately adjustable.

Controller 24 produces an input signal amplified by the gain adjusted in the P-branch, and an input-signal sum amplified by the gain adjusted in the I-branch, based on its characteristics. The summed input signals are those which existed during a specific time period. The PI controller used preferably has a PI-characteristic of this kind. However, controller 24 may have other characteristics as well.

Two switches 28 and 22, as well as two test-signal generators 26 and 20 are provided in accordance with the present invention. Test-signal generator 26 is linked through switch 28 to an adder circuit, which feeds the sum of the output signals from controller 24 and from test-signal generator 26 to electro-motor 12. The output signal from test-signal generator 20 can be selected by switch 22 as a reference input variable. Also provided is an analyzer unit 36, which is supplied with the input signal from controller 24 via tapping pick-up point 35 and, via a tapping pick-up point 37 (not shown in FIG. 2), with the output signal from differentiator 34. Analyzer unit 36 contains both an arithmetic processing unit, a control unit for controlling switches 28 and 22, as well as test-signal generators 26 and 20. The control unit also controls the process of adjusting the various gains in the branches of controller 24. During short measuring intervals, the arithmetic processing unit of analyzer unit 36 samples and quantifies the input signal from controller 24, and the output signal from differentiator 34, weights these signals and determines the various error functions. The integrated current controller, rotary position transducer 10, differentiator 34, adder, first and second test-signal generators 20, 26, and first and second adders can be, for example, digital modules.

To ensure that the control loop does not oscillate for a relatively long time period, in other words to prevent any undamped oscillation from damaging the mechanical or electrical components of the arrangement shown in FIG. 1, the two gains of the P- and I-branch of controller 24 are properly adjusted one after another, during the short measuring intervals. Outside of the measuring intervals, gains which reliably prevent a control loop oscillation are set in the P- and I-branch.

Figure 3:
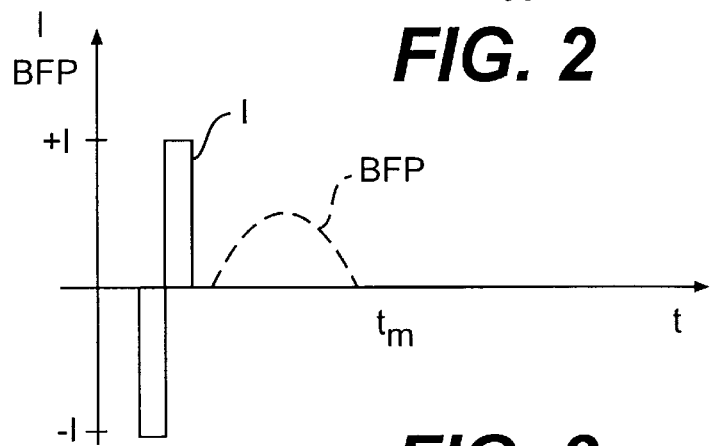
FIG. 3 is a plot showing a test signal for determining the P-component gain of the speed controller, and a weighting function for assessing its stability according to the present invention.

In a first step to determine the optimum gains in the P-branch of controller 24, a reference input variable which is the set-point rotational speed ns, is not predefined by a position control loop 38, as in conventional operation. Instead, a constant value such as zero is predefined as set-point rotational speed ns, via a second switch 22. In addition, the signal from a first test-signal generator 26 is fed via a first switch 28 to the control loop of controller 24. In this way, current pulses which do not exceed the maximum allowable current flow to electro-motor 12 are specified, and any existing current limiting circuit is not activated. This current is specified for a very short period of time, for example for the duration of a control-loop time constant, so that a current pulse is output to electro-motor 12, as illustrated in FIG. 3. FIG. 3 depicts one example of a weighting function BFP used following generation of the current pulse in this manner, actual rotational speed ni is adjusted following the current pulse by the control loop.

Before the current pulse is output, the electro-motor is at a standstill. This ensures that the stability parameters are determined in the most unstable state of electro-motor 12, since the tendency to oscillate is greater at a standstill than during operation.

The rotational speed of electro-motor 12 is sampled and quantized during a short measuring time tm. In response to an undesired oscillation, actual rotational speed ni exhibits an undamped or only weakly damped characteristic. If no oscillation occurs, then actual rotational speed ni is quickly reduced, since rotational speed ns is set to a zero set-point by first test-signal generator 26. For example, test-signal generator 26 is disconnected by switch 28 from the control loop. At this point the ratio V of sampled values of actual rotational speed ni is multiplied by a weighting function BFP, to obtain the unweighted sampled values of actual rotational speed ni in accordance with formula (1), so that no oscillation is occurring when the ratio V<1.

$$V = \frac{\sum_{i=0}^{m} \left| ni(t_i) \times \left(1 - \cos\left(2\pi \frac{t_i}{t_m}\right)\right) \right|}{\sum_{i=0}^{m} |ni(t_i)|} \quad (1)$$

$$F = \sum_{i=0}^{l} bfi(i) * (ni - ns) + \sum_{j=0}^{k} bfi(j) * (nj - ns)^2 \quad (2)$$

where: $(ni - ns) > 0$; $(nj - ns) < 0$

In selecting weighting function BFP, an important consideration is that this weighting function have a value near zero at the beginning of the measuring interval, and that the quotient obtained by dividing the sum of the weighting factors of weighting function BFP by the number of weighting factors be equal to one. No additional constraints are required, and any desired weighting function BFP can be selected if this constraint is met.

The first step is initially performed for a small gain in the P-branch of the controller, so that no oscillation The I-branch is deactivated during the measuring operation since its gain is adjusted to very small values or to zero. After that, the amplification is continually increased exclusively in the P-branch until ratio V almost reaches the value 1. The value of the gain for the P-branch so determined is subsequently multiplied by a factor of less than 1, for example by the factor 0.45 in accordance with Ziegler and Nichols, and is adjusted in the P-branch of controller 24. This ensures that the P-branch cannot give rise to any oscillation in electro-motor 12, or in mechanical components connected thereto.

Electro-motor 12 is excited in a pre-determined fashion by first test-signal generator 26 using a pulse-like current, to ensure that the only reaction to this excitation is essentially from the P-branch of the control loop. In this manner, the P-component of controller 24 can be separated in an especially simple manner through the selection of the excitation signal from test-signal generator 26. Since the greatest tendency of the driving assembly to oscillate occurs from the de-energized neutral position, electro-motor 12 is initially forced into the de-energized state by appropriate current pulses. In response to test-signal generator 26 outputting these current pulses, switch 28 is reopened.

The inverted differential signal of rotational speeds ns-ni is tapped off for analysis directly upstream from controller 24. The system stability can be determined at this point independently of an absolute rotational speed. This is particularly advantageous when working with vertical axles, spindles or journals, which as a rule do not have their de-energized and thus least damped state at zero rotational speed.

In a second step for defining the controller parameters, a set-point rotational speed ns, whose characteristic is that of a jump function, is preset by a second test-signal generator TSG 2 for the control loop, to determine the gain in the I-branch. Test-signal generator TSG 2 is linked via switch 22 to the input of the control loop. The jump in the set-point rotational speed is calculated so as to ensure that electro-motor 12 is not overloaded, and that no current limitation is exceeded. The step response of electro-motor 12 is sampled and quantized during a short measuring interval during the procedure.

An error function F, which can be for example the sum of the rotational speeds which lie above the set-point rotational speed ns and the square of the sum of the rotational speeds which lie below the set-point rotational speed ns, is then calculated in accordance with formula (2). Additionally, the transient response of the control loop in formula (2) is weighted as a function of time by a weighting function BFI.

As a result of the squaring operation, any undershooting nj of set-point rotational speed ns is counted more heavily as an error into the calculation than does any overshooting ni of the rotational speed. In practice, this type of linear weighting of overshooting errors ni and squared weighting of undershooting errors nj with respect to set-point rotational speed ns, brings about a fastest possible convergence to the set-point rotational speed ns.

A weighting function BFI for weighting the deviations from the rotational speed is also performed in formula (2). The summed parameters are multiplied by a coefficient bfi. As a result of weighting function BFI, a first exceeding of the set-point rotational speed ns is virtually insignificant at the beginning of the measuring interval, whereas a subsequent undershooting of set-point rotational speed ns is weighted more heavily in the middle or at the end of the measuring interval.

Figure 4:
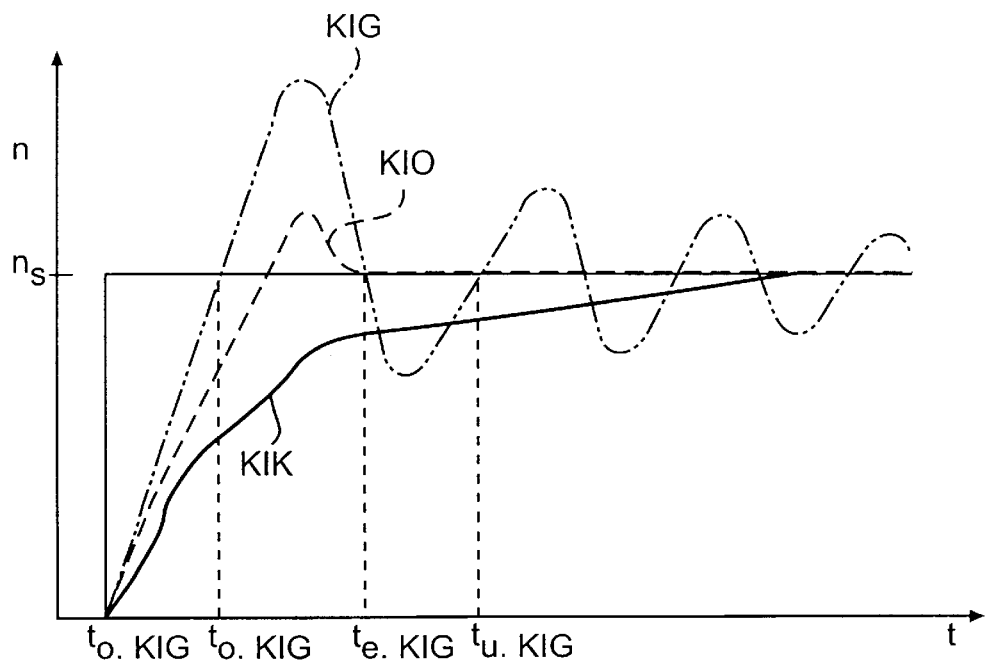
FIG. 4 is a plot showing a set-point rotational speed characteristic and corresponding actual rotational speed characteristics for different I-component gains.

FIG. 4 illustrates various characteristic curves of actual rotational speed ni. Set-point rotational speed ns is output by second test-signal generator 20 as a reference input variable at instant to. In response to an excessive gain in the I-branch of controller 24, the rotational speed characteristic follows curve KIG, and shows many substantial overshoots and undershoots about the set-point rotational speed ns. In response to an insufficient gain in the I-branch, the rotational speed characteristic follows curve KIK and approaches set-point rotational speed ns only slowly. In response to a nearly optimum gain in the I-branch of controller 24, the actual rotational speed ni shows a nearly optimal characteristic in accordance with curve KIO and reaches set-point rotational speed ns as quickly as possible, without excessive oscillation. The instants ta, te and tu indicated refer to curve KIG.

Figure 5:
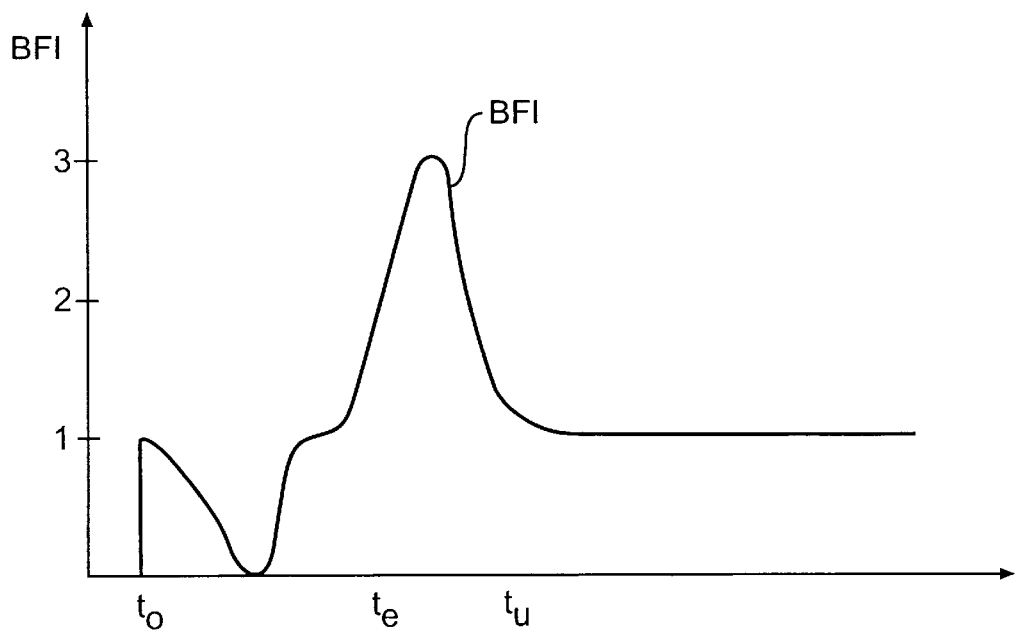
FIG. 5 is a plot showing a weighting function for assessing the stability of the I-component of the rotational speed controller according to the present invention.

FIG. 5 depicts a possible profile of weighting function BFI for the curves KIG shown in FIG. 4. The characteristic rotational speed curve is not used in the time period between to and ta. Also evident is the small weighting of the first overshoot between instants te and tu, and the pronounced weighting of the first undershoot between instants te and tu. The weighting no longer varies after instant tu. Instants tu and te are multiples of ta, and thus need not be redefined for each measurement. The time duration between tu and te, as well as between te and ta corresponds in each case to approximately 2.5 times the duration between ta and to.

Figure 6:
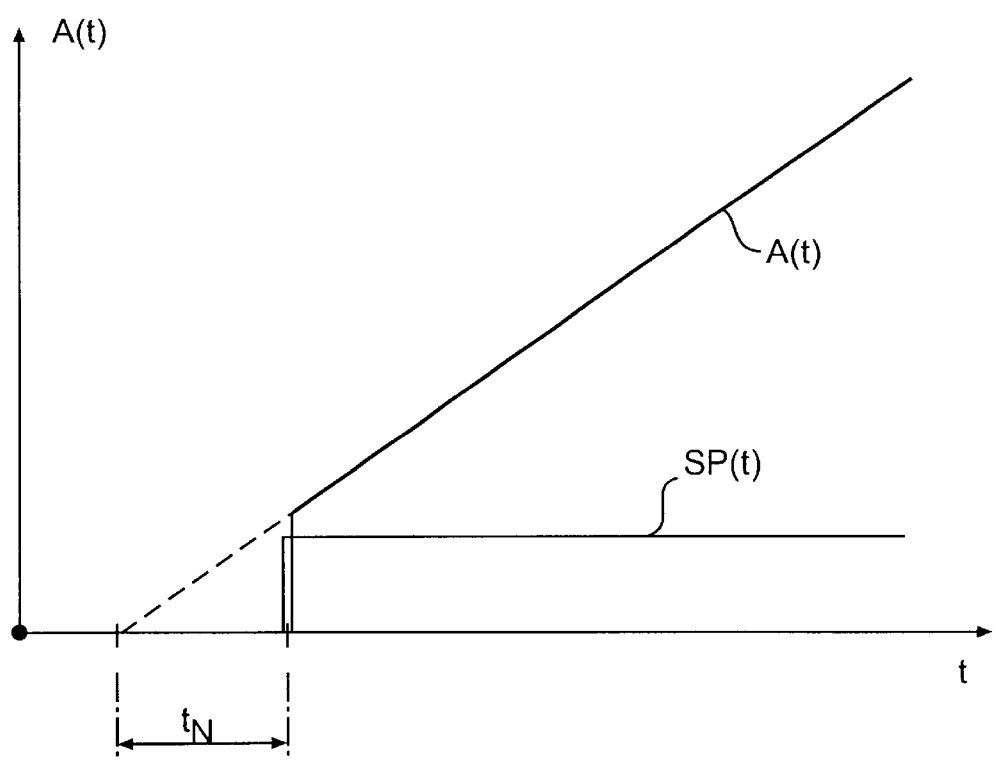
FIG. 6 is a plot showing the integral-action time tn defined for a PI-controller.

To determine optimal curve KIO of the speed characteristic more precisely, and to be able to adjust the optimum gain in the I-branch more precisely, the present invention permits an integral-action reset time tn of controller 24, as shown in FIG. 6. FIG. 6 shows controller output signal A(t) for an open control loop, when controller 24 is excited by a step function Sp(t). Integral-action time tn is derived as the time duration between the instant when controller output signal A(t) does not equal zero, and the instant when the projection of the ascent of controller output signal A(t) is zero.

The integral-action time tn can be calculated from the quotient attained by dividing the amplification gain in the P-branch by the amplification gain in the I-branch of controller 24. To achieve an improved weighting using weighting function BFI, coefficients bfi(i) of weighting function BFI are multiplied by integral-action time tn. Integral-action time tn and coefficients bfi(i) of weighting function BFI continue to be calculated iteratively until an optimum gain is determined for the I-branch. To weight integral-action time tn more heavily in weighting function BFI, it is also possible to multiply coefficients bfi(i) of weighting function BFI p-times by integral-action time tn, as expressed by formula (3).

$$\mathrm{bfi}_{new}(i) = \mathrm{bfi}_{old}(i) \cdot t_n^p \qquad (3)$$

Rise time ta, which elapses until actual rotational speed ni reaches set-point rotational speed ns for the first time, is weighted. The transient response of actual rotational speed ni to set-point rotational speed ns, which is influenced by the adjusted controller parameters of the control loop, is weighted. For this, an additional error function FF is calculated, as expressed by formula (4).

$$FF = F \cdot t_a^k \text{ where } k = 1 \ldots 3 \qquad (4)$$

A large gain at which oscillation is present in the driving assembly is used as a baseline to reduce the gain to a minimum of variable FF from formula (4), and also to adjust the gain in the I-branch. The gain is subsequently increased again until there is a noticeable degradation of for example, approximately 10% in variable FF from formula (4). The value determined immediately prior to this point is then used for the gain in the I-branch.

In one advantageous embodiment, the excitation signals for electro-motor 12 that are generated by test-signal generators 20, 26 can include an identical excitation signal having a negative operational sign, immediately following the pulse-shaped signal triggering a current pulse I, as shown in FIG. 3. The additional, negative, pulse-shaped, rotational-speed signal results in a substantially improved performance when the driving assembly has overcome static friction. This is due to the fact that the elastic mechanical coupling of electro-motor 12 to other subassemblies of the driving assembly permits exertion on the rotor of electro-motor 12 of a force that is dependent upon the angle of rotation. The positive and negative current pulses result in different angular momentums being applied by the motor, one when static friction comes into play, and another when only dynamic friction exists.

In response to the step-shaped rotational speed input by the test-signal generator 20, immediately following the first excitation signal, an additional excitation signal of the same absolute value but with a negative sign can also be generated. The excitation signals according to the invention result in the rotor of electro-motor 12 having the same starting position when the gains in the P- and I-branch are determined. As a result, the position controller is not excited during normal operation.

It is also possible to determine the gain in the I-branch for the reverse direction of rotation, in response to an excitation produced by the step function, and to determine the gain to be adjusted for the I-branch on the basis of the two values of error function FF. This result is particularly advantageous when working with an electro-motor 12, whose load is dependent upon rotational direction, such as the motors used for vertical axles, for spindles and for journals.

What is claimed is:

1. A method for determining an optimum gain of a closed loop speed controller for an electro-motor, the controller having branches with different control characteristics, said method comprising:

defining different control parameters for each of the branches;

selecting a test signal adapted to excite at least one branch of the controller;

exciting the at least one branch of the controller with the selected test signal;

determining an optimum control response of the excited branch of the controller by applying a weighting function to a difference between a set-point rotational speed and an actual rotational speed, said weighting function using an integral-action reset time to determine an optimum gain in at least an integral branch of the controller; and modifying the control parameters until the controller exhibits the optimum control response for the excited branch of the controller.

2. The method as recited in claim 1, further comprising the steps of:

feeding a first test signal to the electro-motor to adjust a gain in a proportional branch of the controller;

determining a time characteristic of the actual rotational speed of the electro-motor in a measuring interval, and weighing said time characteristic using a first weighting function;

continually increasing the gain in the proportional branch of the controller using a small gain in the proportional and integral branch of the controller as a baseline, until an oscillation in the control loop is detected on the basis of the weighting operation performed using the weighting function;

multiplying the gain adjusted in the proportional branch of the controller in response to beginning oscillation by a factor of less than one;

feeding a second test signal as a reference input variable to the control loop to adjust the gain in the integral branch of the controller;

determining a time characteristic of the actual rotational speed of the electro-motor in a measuring interval, and weighing said time characteristic by a second weighting function that includes the integral-action time;

quantifying in the measuring interval a deviation from the set-point rotational speed on the basis of an error function; and reducing the gain in the integral branch of the controller from a baseline of a large gain at which oscillation is present, until a minimum of the error function is present.

3. The method as recited in claim 2, further comprising continually increasing the gain in the integral branch of the controller until the error function is increased by a specific percentage.

4. The method as recited in claim 1, further comprising using a current pulse as a first test signal.

5. The method as recited in claim 1, further comprising using two immediately successive current pulses having a substantially equal absolute value and differing polarity as a first test signal.

6. The method as recited in claim 4, further comprising limiting an amplitude of the current pulses to a maximum allowable current intensity.

7. The method as recited in claim 2, further comprising selecting the first weighting function to have a value substantially equal to zero when starting the measuring interval, and selecting a quotient obtained by dividing a sum of weighting factors of the first weighting function by the number of weighting factors to have a value substantially equal to one.

8. The method as recited in claim 2, further comprising multiplying coefficients of the weighting function by the integral-action time.

9. The method as recited in claim 2, further comprising determining a ratio of the rotational speed characteristic weighted using a first weighting function to the unweighted rotational speed characteristic, and determining that an oscillation is not present when the ratio is smaller than one.

10. The method as recited in claim 2, further comprising multiplying the gain adjusted in the proportional branch of the controller in response to beginning oscillations by a factor having a value of about 0.45.

11. The method as recited in claim 1, further comprising using a step function as a second test signal.

12. The method as recited in claim 11, further comprising calculating a magnitude of the step function on the basis of the gain adjusted in the proportional branch and of the maximum permissible current intensity for the electro-motor.

13. The method as recited in claim 11, further comprising using as a second test signal two step functions, the second step function directly following the first step function and having the same magnitude but different sign.

14. A circuit arrangement for determining an optimum gain of a closed loop speed controller, comprising:
   an electro-motor;
   a rotary position transducer of the electro-motor;
   a differentiator for outputting an actual rotational speed value;
   an adder for adding an inverted output signal of the differentiator to a predefined reference set-point rotational speed input variable;
   a controller adapted to regulate electro-motor current on the basis of the sum of set-point rotational speed and inverted actual rotational speed;
   a first switch to select the reference input variable of the control loop;
   a first test-signal generator selectable by the first switch;
   a second adder disposed between the controller and the electro-motor having one input connectable via a second switch to a second test-signal generator; and
   circuit taps adapted to sample the input signal from the controller and the output signal from the differentiator, said circuit taps being connectable to an analyzer unit.

15. The circuit arrangement as recited in claim 14, wherein the analyzer unit comprises a control device for controlling the first and the second switch and the first and second test-signal generator, the analyzer unit being connected to the controller to modify controller parameters.

16. The circuit arrangement as recited in claim 14, wherein the analyzer unit comprises an arithmetic processing unit, a control unit, and a memory unit.

17. The circuit arrangement as recited in claim 14, wherein the integrated current controller, rotary position transducer, differentiator, adder, first and second test-signal generator, and first and second adder are digital modules.

18. A machine tool comprising:
   a drive for at least one of a spindle and an axle;
   a circuit arrangement for determining an optimum gain of a closed loop speed controller used for controlling the rotational speed of the drive;
   an electro-motor of the drive;
   a rotary position transducer of the electro-motor;
   a differentiator for outputting an actual rotational speed value;
   an adder for adding an inverted output signal of the differentiator to a predefined reference set-point rotational speed input variable;
   a controller adapted to regulate electro-motor current on the basis of the sum of set-point rotational speed and inverted actual rotational speed;
   a first switch to select the reference input variable of the control loop;
   a first test-signal generator selectable by the first switch;
   a second adder disposed between the controller and the electro-motor having one input connectable via a second switch to a second test-signal generator; and
   circuit taps adapted to sample the input signal from the controller and the output signal from the differentiator, said circuit taps being connectable to an analyzer unit.

* * * * *